May 5, 1931.  E. J. O'CONNELL  1,804,269
WELDING APPARATUS
Filed Sept. 23, 1929

Inventor:
Edward J. O'Connell,
by Charles E. Tullar
His Attorney.

Patented May 5, 1931

1,804,269

UNITED STATES PATENT OFFICE

EDWARD J. O'CONNELL, OF SCHENECTADY, NEW YORK, ASSIGNOR TO GENERAL ELECTRIC COMPANY, A CORPORATION OF NEW YORK

WELDING APPARATUS

Application filed September 23, 1929. Serial No. 394,464.

My invention relates to that form of welding wherein an electric arc is maintained between a plurality of electrodes and a suitable fluid is supplied to the arc and comprises means for controlling the supply of fluid and electricity to a torch adapted for practicing such welding.

An object of my invention is to provide means operable upon the application of weight such for instance as the weight of the welding torch to a part thereof to automatically close the fluid supply line, or lines, to the torch and interrupt the supply of electric current to the arc or heating means when the torch is not in use to effect a saving in fluid and to deenergize the torch.

A further object of my invention is to so arrange the valve and switch controlling means of my device that the fluid is supplied to the torch before the electric energy is supplied thereto in order to avoid the danger from an explosion which might result if the mixture of fluid and air in the supply line leading to the torch should become ignited by completing the electric circuit before this mixture had been forced from the supply line by a fresh supply of pure fluid which will not explode.

A further object of my invention is to provide means for controlling the flow of fluid to the torch independently of the control exercised by the valve in the supply line which is operated by the weight of the controlling means above referred to so that independent adjustments may be made in the device to take care of the different fluid pressures and different kinds of welding encountered in the practice of this form of welding.

My invention is particularly useful in connection with apparatus for utilizing the heating effect of flames of atomic hydrogen. The utilization of such atomic hydrogen flames is disclosed and claimed broadly in the application of Irving Langmuir, Serial No. 729,185, filed July 30, 1924, for heating process and apparatus, which application is assigned to the same assignee as the present application. While my invention is well suited for atomic hydrogen welding it is also of general application to the type of welding apparatus wherein an arc is maintained between a plurality of electrodes and a gaseous medium of any suitable character is supplied to the arc.

My invention will be better understood from the following description taken in connection with the accompanying drawing and its scope will be pointed out in the appended claims.

Figure 1:
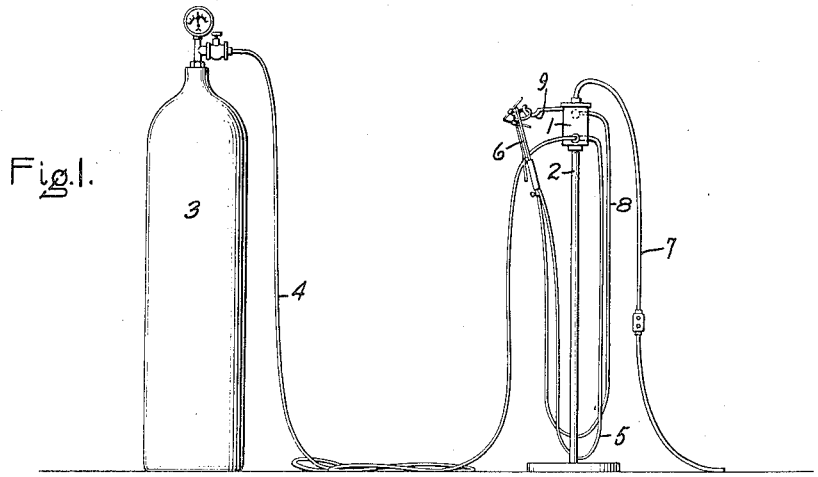
Figure 2:
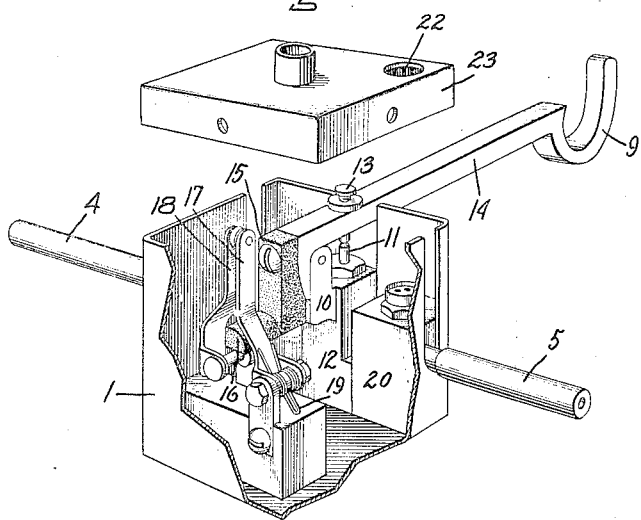
Figure 3:
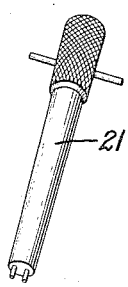
Figure 4:
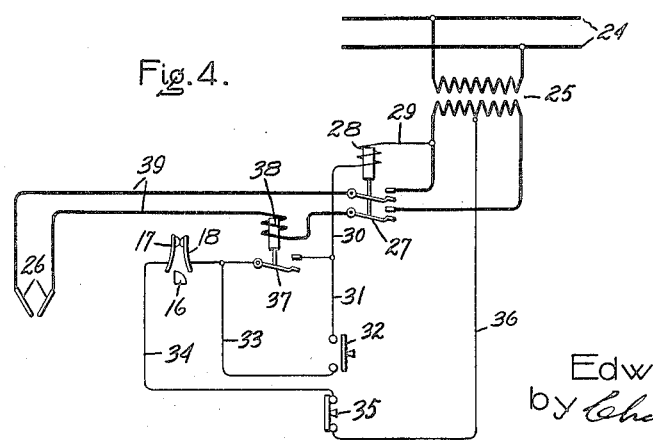

In the drawing, Fig. 1 shows the installation of a device according to my invention in welding equipment suitable for atomic hydrogen welding; Fig. 2 is a perspective view of the device shown in Fig. 1 illustrating one embodiment of my invention; Fig. 3 is a perspective view of a key for adjusting a valve in my device, and Fig. 4 is a diagrammatic representation of one arrangement which the electrical circuits may assume when my device is used.

In Fig. 1 a device according to my invention is shown at 1. In this figure the device is shown as mounted on a pedestal 2 but other arrangements may be used depending upon the convenience of the operator or the nature of the installation. A fluid is supplied to the device 1 from a tank 3 through a conduit or supply line 4 and is discharged from the device through a conduit or supply line 5 to a gas-arc torch 6, having a construction similar to that illustrated and described in Patent No. 1,708,003 to Rudolph A. Weinman, of April 9, 1929, for a welding torch, and assigned to the same assignee as the present application. Electric energy is supplied from a source not shown through a twin conductor 7 to my device 1, and from this device through a twin conductor 8 to the gas-arc torch 6. The torch is shown supported on a hook 9 which extends from the device 1.

Referring to Fig. 2 of the drawing which shows the device of Fig. 1 in detail the hook 9 is pivoted at 10 and is normally biased to an elevated position by means of a spring not shown acting on the plunger 11 of a valve 12 which engages an adjusting screw 13 located in the arm 14 of the hook 9. Attached to the left hand end of the arm 14 of the hook 9 is a member 15 formed of insulating material. The lower portion of this member terminates in a cam section 16 which upon depression of the hook 9 engages a movable contact 17 which is normally held in engagement with a fixed contact 18 by means of a spring 19. When the hook 9 is in its normal elevated position the cam section 16 of the insulating member 15 is held out of engagement with the movable contact 17. When however a weight is applied to the hook 9, such as by supporting the torch 6 thereon, the valve 12 is closed against the action of its spring by means of the application of pressure through the adjusting screw 13 and the plunger 11 connected to the valve so as to close the passage through the gas line 4, 5 extending through the device 1 and cam segment 16 is raised into engagement with the movable contact 17 which it moves against the action of the spring 19 away from the fixed contact 18, thereby interrupting the electrical circuit through contacts 17 and 18. When the gas-arc torch is removed from the hook 9 the valve is again opened and thereafter the contacts allowed to close in order to complete the electrical circuit through them.

Enclosed within the device 1 and in series with the stop valve 12 is a throttling valve 20. This valve is used for controlling independently of the stop valve 12 the amount of gas supplied to the gas-arc torch. This valve can be adjusted by means of a key 21 shown in Fig. 3 which can be inserted within the device 1 through an opening 22 in the cover 23 of the device. It is thus possible to properly adjust the supply of gas for different operating conditions and to make this adjustment in such manner that the workman can not thereafter readily change the adjustment so that proper welding conditions can be established and maintained. By using the throttling valve 20 it is possible to greatly simplify the stop valve 12 which in connection with the valve 20 then serves only as a means for opening or closing the passage through the gas line 4, 5.

The location of the contacts 17, 18 in the electrical circuits of one arrangement embodying my invention is shown in Fig. 4. In this figure current is furnished from a source of supply 24 by means of a transformer 25 to the welding electrodes 26 of the gas-arc torch through an electromagnetic switch 27. This switch is operated by a coil 28 energized through conductors 29, 30, and 31, normally open hand switch 32, conductor 33, contacts 17 and 18, conductor 34, normally closed hand switch 35, and conductor 36 to an intermediate tap of transformer 25. Switch 32 is shunted by an electromagnetic switch 37 whose operating coil 38 is in series with the welding circuit 39 extending from the transformer 25 to the welding electrodes 26.

The operation of the device illustrated in Figs. 1 and 2 in connection with an electric circuit arrangement such as shown in Fig. 4 is as follows: The operator removes the gas-arc torch 6 from the hook 9. The hook 9 is immediately raised to its elevated position by means of the spring associated with valve 12 which also opens valve 12, allowing gas to flow from the tank 3 through supply lines 4 and 5 to the gas-arc torch 6. The removal of the gas-arc torch 6 from the hook 9 also permits the movable contact 17 under the influence of spring 19 to come into engagement with the fixed contact 18 to complete an electrical circuit therethrough. The welding operator then closes the normally open hand switch 32 which completes the energizing circuit for the coil 28 of the electromagnetic switch 37 as follows: From one terminal of the secondary of the transformer 25 through conductor 29, coil 28, conductors 30 and 31, switch 32, conductor 33, contacts 17 and 18, conductor 34, switch 35, and conductor 36 to the tap terminal on the secondary of the transformer 25. The switch 27 will thus be closed completing the welding circuit 39 from the transformer 25 to the welding electrodes 26. As soon as current flows in this circuit the coil 38 of the electromagnetic switch 37 will be energized closing the switch 37. This switch shunts switch 32 which may then be released to its normal open circuit position, the energizing circuit for the coil 28 thereafter being completed through switch 37. If, however, the arc should go out between the electrodes 26, switch 37 will open and this in turn will open the switch 27 to disconnect the welding torch from the source of supply 25. By utilizing this arrangement the operator is protected from the danger of shock by coming into contact with the electrodes 26 when there is no arc operating between these electrodes. In order to interrupt the welding operation, the operator may separate the electrodes 26 to break the arc which will result in switch 37 deenergizing the main switch 27 or the circuit may be opened by operating the normally closed switch 35. The torch may also be deenergized by hanging it on hook 9 which will move cam 16 against contact 17 thereby separating it from contact 18 and breaking the energizing circuit for coil 28 of switch 27. Placing the torch on hook 9 also closes valve 12 thereby interrupting the flow of gas to the torch.

In some cases it may prove advantageous to adjust screw 13 so that the valve 12 is not completely closed when the torch is hung on hook 9 so that a small amount of gas is supplied to the torch to maintain a small flame there so that if one unacquainted with the equipment should take the torch from the hook an explosive or disagreeable gas would not be liberated into the surrounding air but would be burned as in the usual operation of the torch.

The particular device illustrated and described may be modified to adapt it for the use of a plurality of gases. Liquids, which in the arc are decomposed to gases, may also be controlled in the same manner as is the gas in the illustrated arrangement. Other modifications will occur to those skilled in the art to which this invention pertains. The particular embodiment of the invention illustrated and described herein has been selected for the purpose of clearly setting forth the principles involved and I therefore aim by the appended claims to cover all modifications within the true spirit and scope of my invention.

What I claim as new and desire to secure by Letters Patent of the United States, is:

1. In combination with a fluid supply line and an electric circuit, means in said fluid supply line for opening and closing the passage through said line, means in said electric circuit for opening and closing said electric circuit and an article supporting means operated by the weight of said article lying thereon for closing said passage through said line and for opening said electric circuit.

2. In combination with a fluid supply line and an electric circuit, a valve in said fluid supply line for opening and closing the passage through said line, means for biasing said valve to its open position, switching means in said electric circuit for opening and closing the electric circuit, means for biasing said switching means to circuit closing position, and means adapted to support an article operated by the weight of said article for moving said valve to its closed position and for opening said switching means.

3. In combination with a fluid supply line and an electric circuit, a stop valve in said fluid supply line for opening and closing the passage through said line, means for biasing said stop valve to its open position, a controlling valve in said fluid supply line for controlling the flow of fluid through said said line, means for adjusting said controlling valve, a switch in said electric circuit for opening and closing said electric circuit, means for biasing said switch to its closed position, and means adapted to support an article and operated by the weight of said article for closing said stop valve and opening said electric switch.

4. Welding apparatus comprising a gas-arc welding torch having means for maintaining arc and means for supplying gas to said arc, means for controlling the supply of gas to said torch, means for controlling the supply of electric energy to said torch and means responsive to the weight of said torch adapted to support said torch when not in use for interrupting the flow of gas and the supply of electric energy to said torch when supporting the weight of said torch and for establishing the flow of gas and electric energy to said torch when not supporting said torch.

5. Welding apparatus comprising a torch having a fluid passageway therein and electric heating means associated with said passageway, means including a circuit and a circuit controlling device for supplying electric energy to said heating means, means for biasing said circuit controlling device to open said circuit, means for initially actuating sad circut controlling device to close said circuit, means responsive to the flow of current in said circuit to said heating means for maintaining said circuit closed, means including a conduit for supplying fluid to said passageway in said torch, and means controlled by the weight of said torch for interrupting the flow of fluid through said conduit and for opening said circuit when said torch is supported thereby.

In witness whereof I have hereunto set my hand this 20th day of September, 1929.

EDWARD J. O'CONNELL.